United States Patent [19]

Eccles et al.

[11] Patent Number: 5,564,903
[45] Date of Patent: Oct. 15, 1996

[54] IN-LINE RAM AIR TURBINE POWER SYSTEM

[75] Inventors: Steven R. Eccles, Torrance; Stephen L. Grosfeld, Cerritos; Allen C. Hansen, Anaheim, all of Calif.

[73] Assignee: AlliedSignal Inc., Morris Township, N.J.

[21] Appl. No.: 342,071

[22] Filed: Nov. 18, 1994

Related U.S. Application Data

[63] Continuation-in-part of Ser. No. 156,049, Nov. 23, 1993.

[51] Int. Cl.[6] ................................. B64D 41/00
[52] U.S. Cl. ............................ 416/174; 416/500; 244/58; 384/535
[58] Field of Search ..................... 416/142, 171, 416/174, 500, 137; 244/58; 384/535, 536; 290/55

[56] References Cited

U.S. PATENT DOCUMENTS

| | | | |
|---|---|---|---|
| 2,955,656 | 10/1960 | Balje et al. | 416/142 |
| 2,978,209 | 4/1961 | Kerry . | |
| 2,988,327 | 6/1961 | Trowbridge et al. | 416/137 |
| 3,125,960 | 3/1964 | Chilman | 244/58 |
| 3,638,421 | 2/1972 | Chilman . | |
| 4,411,596 | 10/1983 | Chilman | 416/51 |
| 4,676,458 | 6/1987 | Cohen . | |
| 4,717,095 | 1/1988 | Cohen et al. . | |
| 4,742,976 | 5/1988 | Cohen | 244/58 |
| 4,952,076 | 8/1990 | Wiley, III et al. | 384/535 |
| 4,991,796 | 2/1991 | Peters et al. | 244/58 |
| 5,122,036 | 6/1992 | Dickes et al. . | |
| 5,174,719 | 12/1992 | Walsh et al. . | |
| 5,398,780 | 3/1995 | Althof et al. | 244/58 |

FOREIGN PATENT DOCUMENTS

| | | | |
|---|---|---|---|
| 612062 | 6/1978 | U.S.S.R. | 416/142 |
| 2033024 | 5/1980 | United Kingdom | 416/174 |

*Primary Examiner*—Edward K. Look
*Assistant Examiner*—James A. Larson
*Attorney, Agent, or Firm*—James W. McFarland

[57] ABSTRACT

A ram air turbine power system is provided with a deployable ram air turbine mounted in-line with a power supply unit such as an electrical generator and/or an hydraulic pump. The ram air turbine includes a turbine shaft supported for rotation by bearings within a generator housing, wherein a rear end of the turbine shaft and a generator shaft are supported by a common bearing, and further wherein the forwards ends of the turbine and generator shafts are supported by a pair of bearings separated by a resilient bearing mount. In addition, the in-line ram air turbine and related power supply unit are supported from a hollow strut with hydraulic and electrical lines and related mechanical linkages extending therethrough.

10 Claims, 5 Drawing Sheets

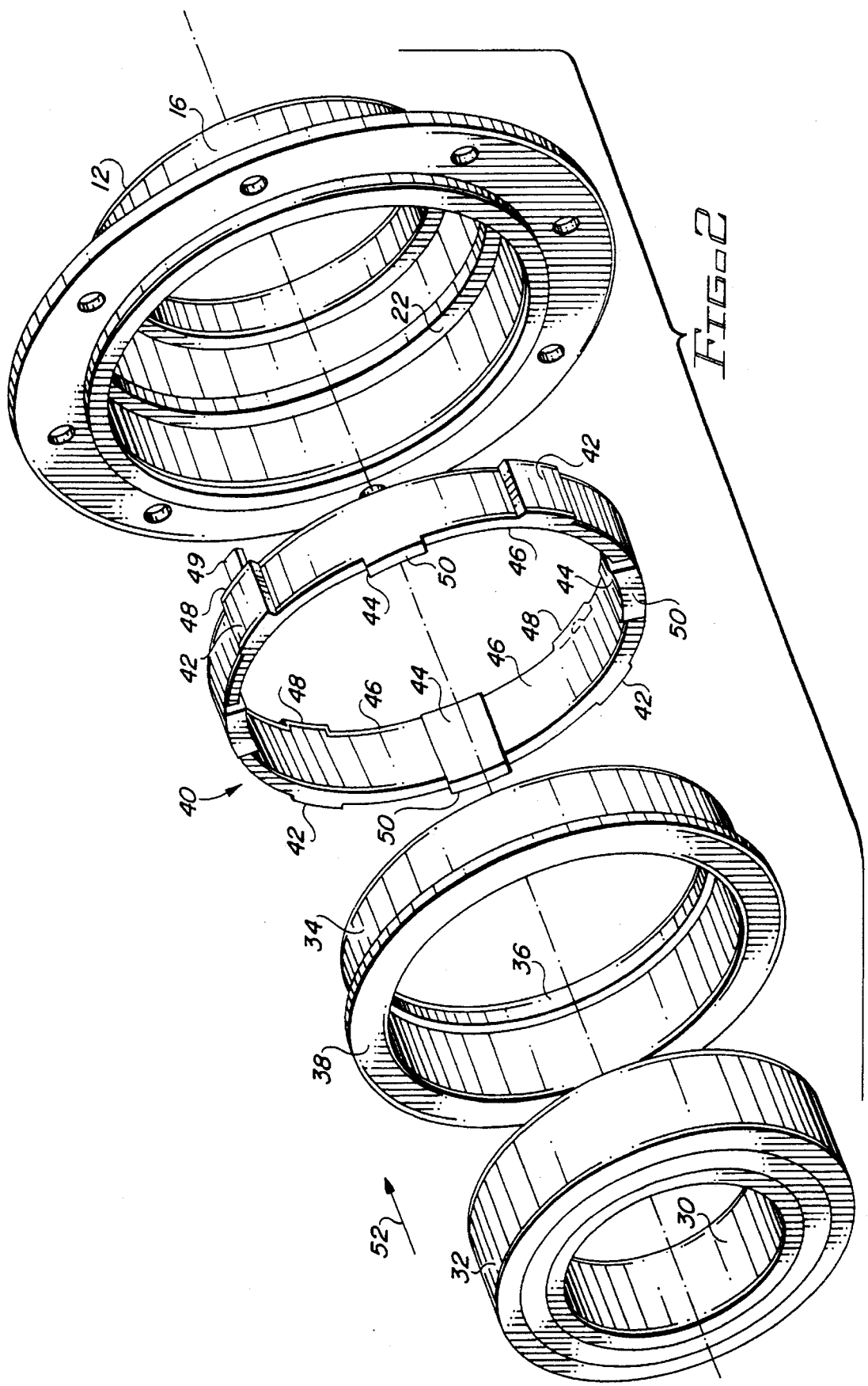

IN-LINE RAM AIR TURBINE POWER SYSTEM

BACKGROUND OF THE INVENTION

This is a continuation-in-part of copending U.S. Ser. No. 08/156,049, filed Nov. 23, 1993.

This invention pertains to roller bearings of the type subjected to substantial radial and axial loads such as may be utilized in turbomachinery. More particularly, this invention relates to a resilient bearing mount adapted for use in a ram air turbine power system of the type used as a back-up system for providing electrical and/or hydraulic power in an aircraft or the like.

Turbomachinery such as may be utilized in a ram air turbine for aircraft typically must carry and transmit to the surrounding housing significant radial and axial loads as may be induced upon the turbine governor and blades of such machinery. It has been known previously to utilize a resilient mount ring or isolator between the housing and the outer bearing race in order to resiliently mount a roller ball bearing to the housing for radially journalling the shaft and for absorbing axial loading. While such resilient mount rings are generally effective in many applications of roller ball bearings, the significant axial loads as generated by the turbine governor and blades in a ram turbine can introduce substantial frictional contact on the mount ring.

In addition, while in-line ram air turbine power systems have been previously proposed, the bearing load requirements for the turbine shaft and a drive shaft for the related power unit, such as an electrical generator or hydraulic pump, have generally required some type of bearing carrier structure disposed axially between the ram air turbine and the in-line power unit. This provision of a separate bearing carrier undesirably increases the overall length and the mechanical complexity of the power system.

The present invention provides a significantly improved in-line ram air turbine power system wherein a special bearing mount arrangement including a resilient mount ring or isolator as described above is employed to permit rotational support of the turbine shaft directly from a drive shaft for the power generator.

SUMMARY OF THE INVENTION

It is an important object of the invention to provide a resilient isolation mount ring for a roller bearing subject both to axial and radial loads, wherein the configuration of the resilient mount ring prevents and precludes frictional rubbing contact of the mount ring with the housing and the bearing race.

More particularly, the invention contemplates a resilient isolation mount ring disposed between the housing and the outer race of the bearing, wherein radially inwardly and outwardly extending pads on the mount ring actively contact the housing and the bearing race to define flexible beam portions between these radial pads. The beam portions are radially flexible in order to resiliently mount the bearing upon the housing in known fashion. With this arrangement, the present invention contemplates the addition of axial pads at opposite ends of the mount ring which respectively engage thrust shoulders on the housing and on the bearing race. The axial pads engage the thrust shoulders to transmit axial thrust from the bearing to the housing. Importantly, the axial pads serve to space and separate the beam portions of the resilient mount from the housing and the race to avoid frictional contact therewith. In this manner, frictional rubbing of the beam portions of the resilient mount is fully precluded.

This improved bearing arrangement, including the resilient mount ring, is advantageously employed in a ram air turbine power system. More particularly, a ram air turbine unit includes a turbine shaft which protrudes forwardly with an in-line geometry from a power unit such as an electrical generator. Bearing support for the turbine shaft is provided by front and rear bearing units mounted within the generator, wherein the rear bearing unit also provides common support for a generator shaft driven by the turbine shaft. The front bearing unit is associated with the resilient mount ring, as described above, which functions to space the front bearing unit from the generator housing and a third bearing unit adapted to rotatably support a front end of the generator shaft. With this construction, a compact bearing arrangement is provided in an in-line geometry, without requiring a separate bearing carrier between the ram air turbine and the generator.

In accordance with further aspects of the invention, the generator may be connected in turn and in-line with another power unit such as an hydraulic pump. The entire system, including the ram air turbine and the associated power unit or units are suspended from the fuselage or wing of an aircraft by a hollow strut which defines a protected passage for pass-through installation of electrical and/or hydraulic lines and mechanical linkages.

These and other objects and advantages of the present invention are specifically set forth in the following detailed description of the preferred embodiment of the invention, when read in conjunction with the accompanying drawings.

BRIEF DESCRIPTION OF THE DRAWINGS

The accompanying drawings illustrate the invention. In such drawings:

FIG. 2 is an exploded perspective view of various components of the roller bearing, resilient mount, and housing of the present invention;

DETAILED DESCRIPTION OF THE PREFERRED EMBODIMENTS

Figure 1:
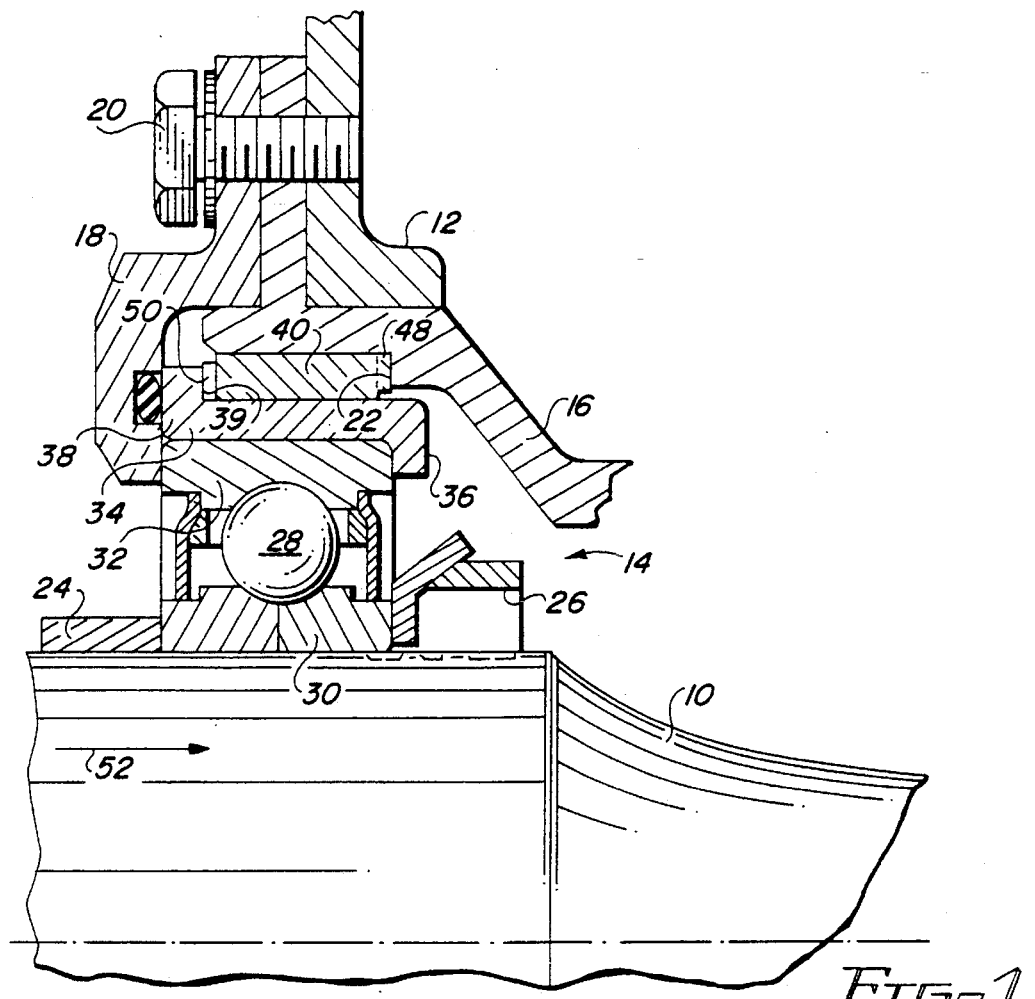
FIG. 1 is an axial cross-sectional view of a bearing constructed in accordance with the principles of the present invention, with portions of the associated stationary housing and rotating shaft also illustrated.
Figure 3:
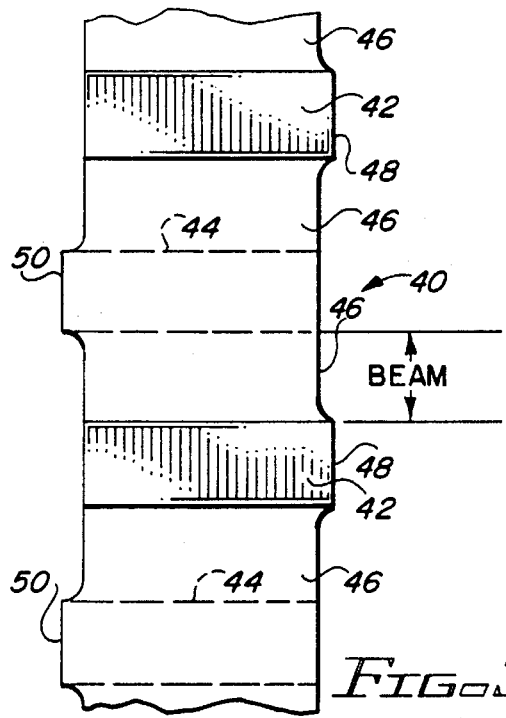
FIG. 3 is a partial side view of the resilient mount constructed in accordance with the principles of the present invention, with portions exaggerated in relative dimension for clarity of illustration.

Referring now more particularly to FIGS. 1–3, illustrated is a shaft 10 as may be carrying the turbine of a ram air turbine. Such a ram air turbine (FIGS. 5–7) is deployable from the body of an aircraft in an emergency situation into the airstream outside the aircraft. The ram effect of the airstream drives the turbine to generate emergency power. As such, the shaft 10 is subject to significant axial and radial loads, the axial thrust being up to 400 lbs.

The shaft is rotatably mounted within the stationary housing 12 through a bearing assembly generally denoted by the numeral 14. Typically the housing 12 may include a bearing carrier 16 and bearing retainer 18 which are rigidly secured to the main housing 12 through bolts 20. Pertinent to the present invention is the radially inwardly depending thrust shoulder 22 on bearing carrier 16. This first thrust shoulder 22 absorbs axial thrust loading from the bearing assembly 14 to the housing 12. The bearing assembly 14 is mounted to shaft 10 through conventional securement elements 24, 26.

The bearing assembly 14 illustrated is a conventional roller ball bearing having a plurality of ball bearing elements 28 in rolling engagement with an inner race 30 rigidly secured to rotate with the shaft 10, and an outer race 32 which is stationary. In the embodiment illustrated in FIG. 1, an axially extending thrust liner 34 is disposed between the housing and the outer race 32, and includes radially inwardly and outwardly turned ends 36, 38. Axial thrust indicated by arrow 52 directed rightwardly as viewed in FIG. 1 is transmitted from the shaft 10 through the inner race 30, bearing elements 28, and the outer race 32 to the end 36 of the thrust liner. From here, the axial thrust is transferred to the opposite end 38 of the thrust liner 34. A small clearance gap is located between bearing retainer 18 and both the bearing outer race 32 and thrust liner end 38 to preclude any contact during operation.

Importantly, the present invention incorporates a resilient isolation mount ring 40 which is disposed between the bearing carrier 16 and the thrust liner 34 of the bearing. As best depicted in FIGS. 2 and 3, the mount ring 40 includes a first set of radially extending pads 42 which extend radially outwardly from the mount ring 40 to directly engage bearing carrier 16. The first set of radial pads 42 are regularly spaced about the circumference of the mount ring 40, four pads 42 being illustrated in the embodiment of FIGS. 1–3.

The resilient mount ring 40 also includes a second set of radial pads 44 which extend radially inwardly from the resilient mount ring 40 to directly engage the outer surface of the thrust liner 34. These second radial pads 44 are also regularly spaced about the circumference of the mount ring in alternating, interdigitated relation to the first set of radial pads 42. Between the first and second sets of pads 42, 44 are defined a plurality of flexible beam portions 46 of the resilient mount ring 40. These flexible beam portions 46 are flexible in a radial direction in order to stiffly, yet resiliently mount the bearing assembly 14 upon the housing 12. By permitting the bearing assembly 14 to move in a radial direction, the resilient isolation mount ring 40 acts like a spring to absorb shaft and rotor vibrations. The radial dimensions of the first and second sets of radial pads 42, 44 are exaggerated in proportion to the remainder of the mount ring 40 for clarity of illustration. It will be appreciated by those skilled in the art that the number, placement, and height or radial dimension of the radial pads 42, 44 are chosen in order to provide the resiliency needed for absorbing radial motion in the particular application of the bearing.

In the resilient mount ring 40 of the present invention there is also included a first set of axially extending pads 48 which extend axially from a first end face of the isolation mount ring 40 in direct engagement with the first thrust shoulder 22 on the housing bearing carrier 16. Importantly, the first set of axial pads 48 are disposed at the same circumferential locations as the first set of radial pads 42 such that both the sets of pads 42, 48 engage the housing bearings carrier 16 in non-moving relation thereto.

Additionally, the resilient isolation mount ring 40 includes a second set of axial pads 50 which extend axially from a second, opposite axial end of the mount ring 40 to directly engage a second thrust shoulder 39 defined at the end 38 of thrust liner 34. The axial pads 50 are located at the same circumferential locations as the second set of inwardly extending radial pads 44 such that both the axial pads 50 and radial pads 44 contact the thrust liner 34 in non-moving relation thereto.

Preferably, an anti-rotation tab 49 extends further axially from one of the axial pads 48 to be loosely received in a groove in the housing bearing carrier 16. Tab 49 prevents rotation of resilient mount ring 40.

In operation, radial loading on the shaft 10 is transmitted through the bearing assembly 14 to the outer surface of thrust liner 34 to the inwardly extending second set of radial pads 44 on the isolation mount ring 40, through the mount ring 40 to the first set of outwardly extending radial pads 42 to ultimately be transmitted to the housing bearing carrier 16. The flexible beam portions 46 of the mount ring 40 can flex radially to absorb radial vibrations and motion. Axial thrust, as illustrated by the arrow 52 in FIG. 1, is transmitted through the bearing assembly to the thrust liner 34 and the second thrust shoulder 39. From here the axial thrust is transmitted through the second set of axial pads 50 on the mount ring 40, through the mount ring 40 itself, and then to the first set of axial pads 48 for ultimate transmission to the housing bearing carrier 16.

Importantly, the first and second sets of axial pads 48, 50 axially space the beam portions 46 from the thrust liner 34 and the bearing carrier 16. As a result, the beam portions 46 an flex radially in non-contacting relation to the first and second thrust shoulders 22, 39. Elimination of this sliding friction and substantially all contact between the radially flexible beam portions 46 and the adjacent thrust shoulders 22, 39 allows free and predictable radial flexure of the beam portions 46. This permits the isolation mount ring 40 to be designed for absorbing radial motion in a highly predictable fashion. In comparison, prior art arrangements allow direct contact between the radial flexing beam portions of the isolation mount ring upon the adjacent axial thrust faces.

Figure 4:
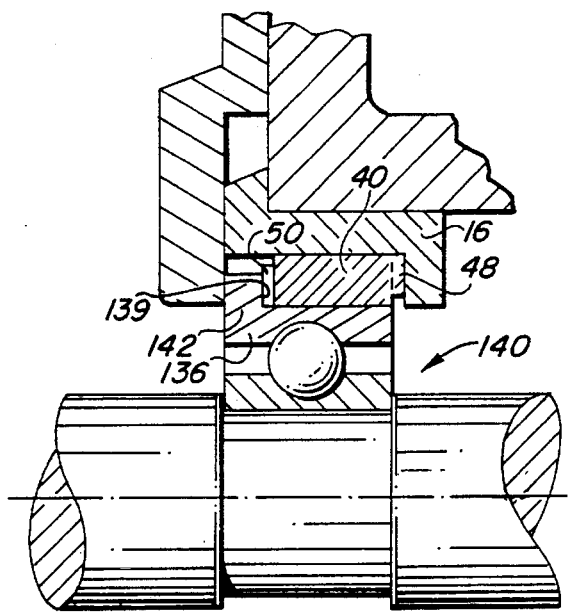
FIG. 4 is a view similar to FIG. 1 but showing a modified version of the present invention.

FIG. 4 illustrates a modified arrangement of the present invention inasmuch as the thrust liner 34 of FIG. 1 has been eliminated. In particular, the bearing assembly 140 illustrated in FIG. 4 is a flanged bearing having a radially upstanding flange 142 at one end thereof to define the second thrust shoulder 139. The same resilient mount ring 40 is illustrated in FIG. 4, but with the axially extending pads 50 directly contacting the second thrust shoulder 139 integrally formed on the outer race 136 of bearing assembly 140. It will be apparent that the FIG. 4 arrangement operates in the same manner as described above with respect to FIGS. 1–3.

Figure 5:
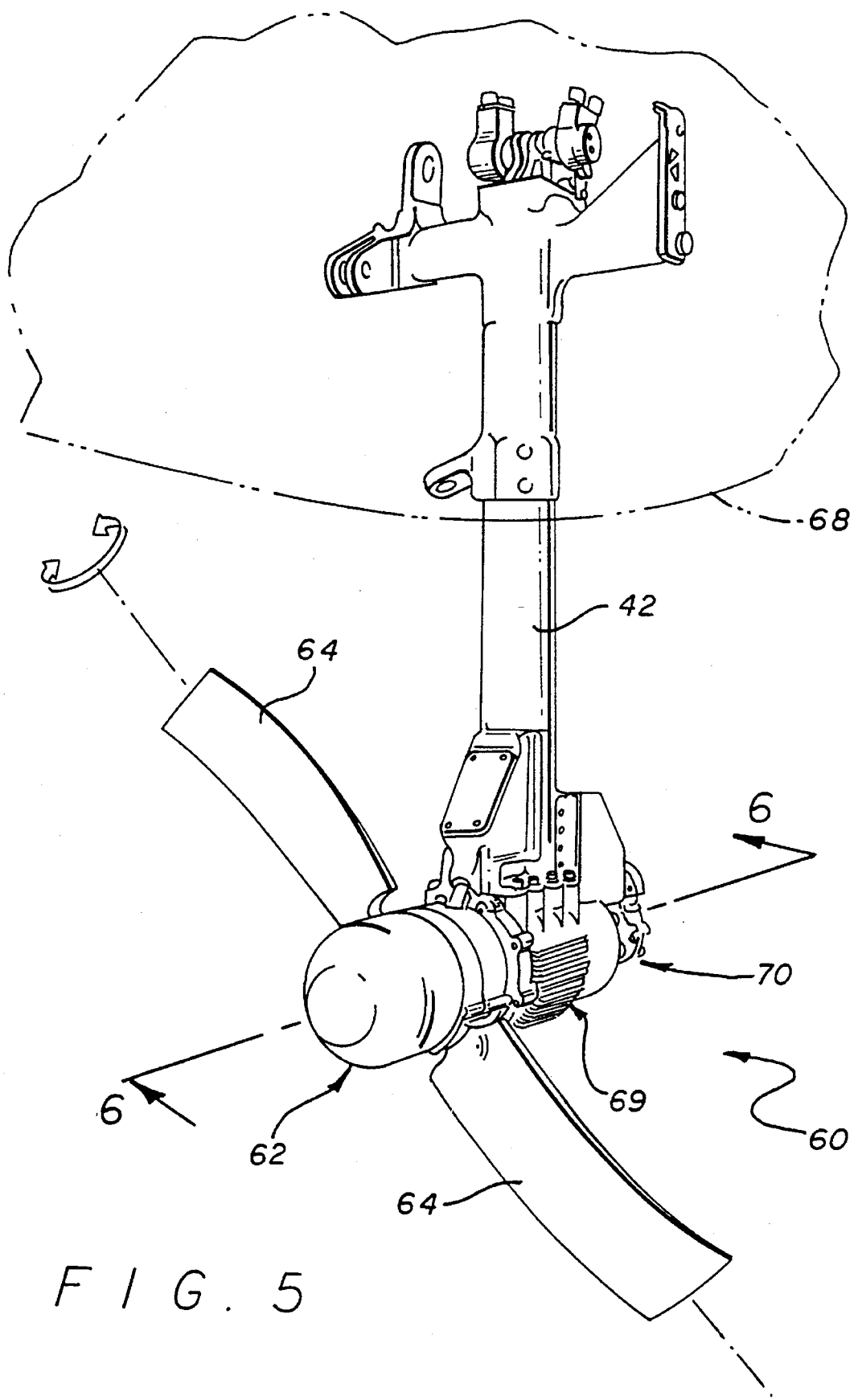
FIG. 5 is a fragmented perspective view showing an in-line ram air turbine power system in accordance with the invention.
Figure 6:
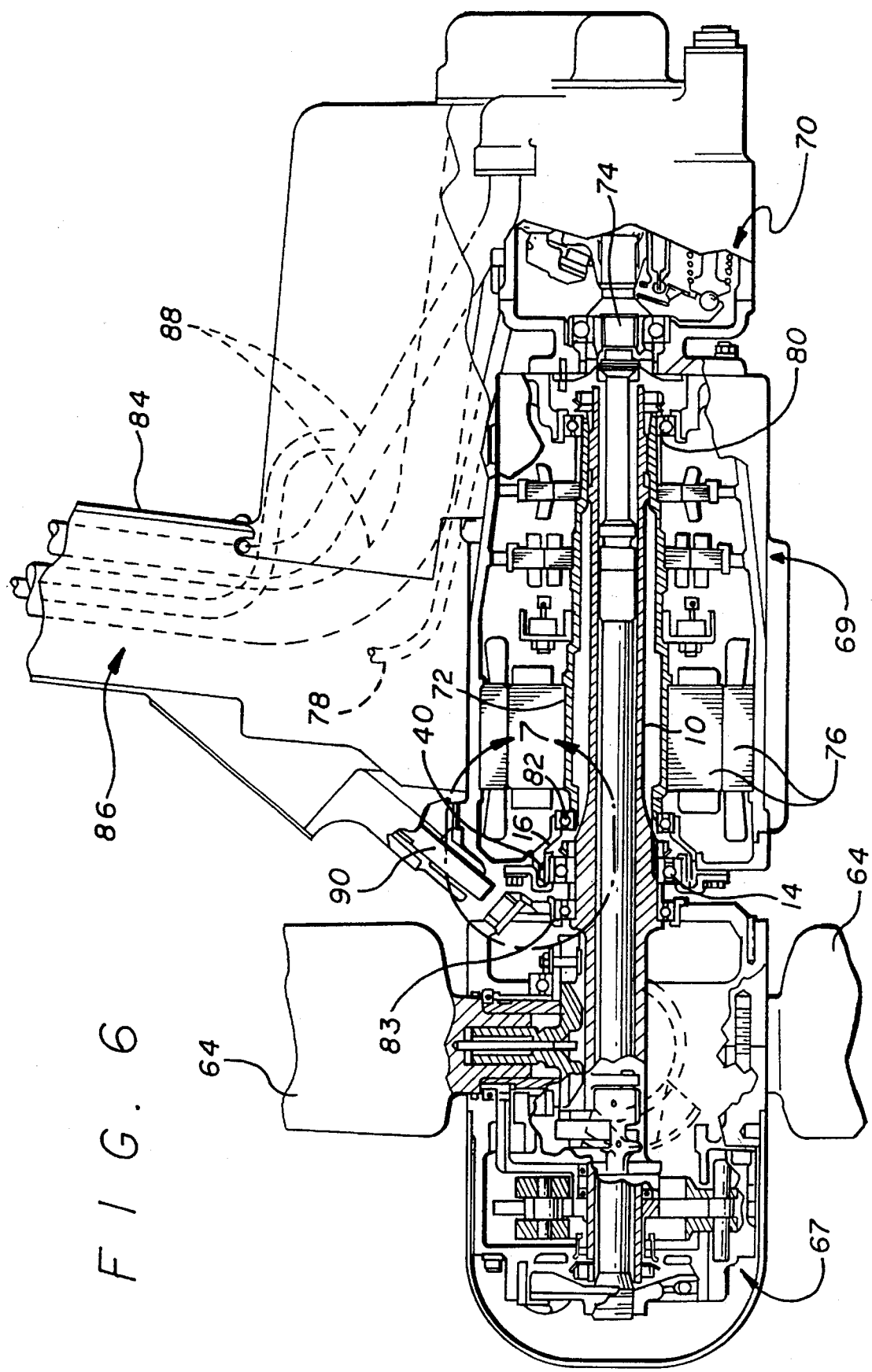
FIG. 6 is a longitudinal sectional view taken generally on the line 6—6 of FIG. 5.
Figure 7:
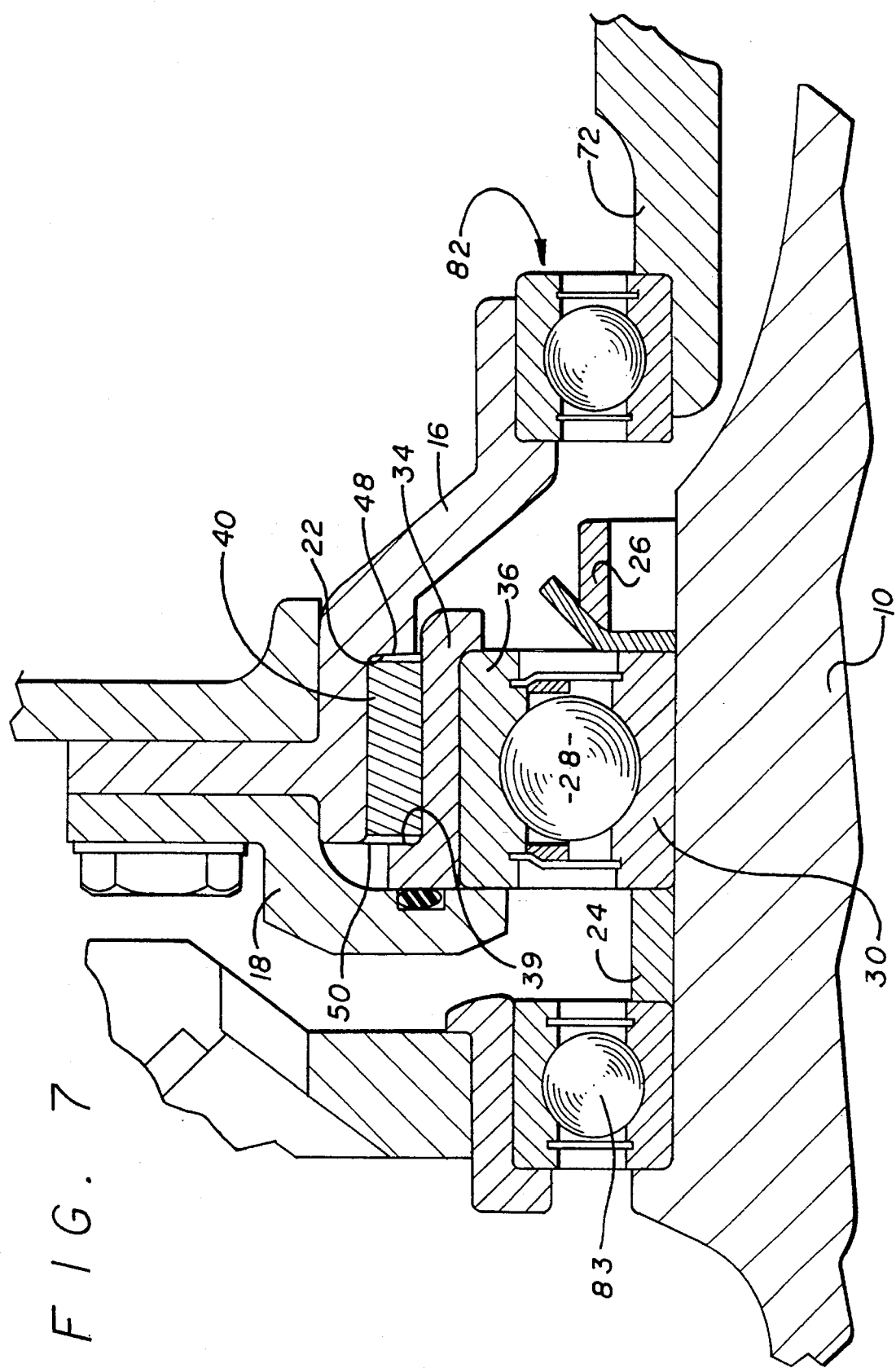
FIG. 7 is an enlarged fragmented sectional view corresponding to the encircled region 7 of FIG. 6.

FIGS. 5–7 illustrate the bearing arrangement of FIGS. 1–4 as beneficially employed in an in-line ram air turbine power system referred to generally by the reference numeral 60. As shown, the power system 60 comprises a ram air turbine 62 with a pair of turbine blades 64 projecting radially outwardly from a rotary hub which may include speed control governor means 67 (FIG. 6) of the type described, for example, in copending U.S. Ser. No. 08/341,718 filed Nov. 18, 1994, entitled "Ram Air Turbine With Secondary Governor," which is incorporated by reference herein. In operation, when deployed from the fuselage or wing 68 (FIG. 5) of an aircraft, the ram air turbine 62 drives a turbine shaft 10 (FIG. 6) for rotatably powering an auxiliary power unit such as an electrical generator 69 mounted in-line therewith. In addition, and in the preferred form, the turbine shaft 10 rotatably drives a hydraulic pump 70 such as a swash plate pump depicted in FIG. 6. In this regard, as shown in FIG. 6, the turbine shaft 10 is rotatably supported within bearings mounted in the generator unit 69, thereby avoiding a separate bearing carrier structure disposed between the ram air turbine and the generator unit. A rear or distal end of the turbine shaft 10 is rotationally coupled by a press-fit or the like to a rear or aft end of a hollow tubular generator shaft 72, and also to a drive shaft 74 of the hydraulic pump 70. The generator shaft is appropriately associated with generator elements 76 for generating electrical power which is suitably coupled via conductor cables 78 or the like to the aircraft.

The bearing arrangement for supporting the turbine shaft 10 within the generator unit 69 comprises a simplified bearing geometry for commonly supporting the turbine shaft 10 and the generator shaft 72 coaxially therewith. More particularly, an aft or rear bearing unit such as a ball bearing unit 80 is provided for commonly supporting the interconnected turbine and generator shafts 10, 72 at or near the rear end of the generator unit housing. As shown best in FIG. 7, the front or forward ends of the turbine and generator shafts are separately supported within the generator housing by a corresponding pair of ball bearing units 14 and 82, wherein the latter bearing unit 82 is carried within the carrier 16 and vibrationally isolated from the generator housing and the former bearing unit 14 by means of the resilient mount ring 40, as previously described. That is, the generator shaft 72 extends forwardly from the aft bearing unit 80, in coaxially spaced relation to the turbine shaft 10 for separate rotational support of the forward ends of the turbine and generator shafts 10, 72 by means of the bearing units 14, 82 respectively. With this arrangement, the front or aft ends of the turbine and generator shafts 10, 72 are rotatably supported for high speed operation, with the isolator mount ring 40 resiliently accommodating fluctuating radial loads on the turbine shaft in isolation from the rotating generator shaft 72. An additional ball bearing unit 83 may be provided on the shaft 10 at the aft end of the hub of the ram air turbine 62, if desired.

In accordance with further aspects of the invention, the in-line ram air turbine power system 60 as described above is carried at the lower end of a hollow mounting strut 84 (FIGS. 5 and 6). The mounting strut 84 is adapted, as is known in the art, for pivotal movement between a normal stored position within the fuselage or wing of an aircraft, and a downwardly protruding deployed position as viewed in FIGS. 5 and 6. Importantly, the hollow strut 84 defines a passage 86 through which the conductive cables 78 from the electrical generator 69 may pass to the aircraft. Similarly, hydraulic flow lines 88 from the hydraulic pump unit 70 are conveniently passed through the hollow strut 84 to the aircraft. In addition, as may be desired, other mechanical linkage structures such as a retractable release pin 90 for releasing the ram air turbine upon deployment may also extend through the hollow strut 84. With this construction, the entire ram air turbine system inclusive of the depending strut 84 may have a desirable aerodynamic shape with all important couplings and linkages protectively concealed against wind damage or the like.

Various alterations and modification to the preferred arrangements described in detail above will be apparent to those skilled in the art. Accordingly, the foregoing detailed description should be considered exemplary in nature and not as limiting to the scope and spirit of the present invention as set forth in the appended claims.

What is claimed is:

1. A ram air turbine power system, comprising:

a ram air turbine having a rotary hub with a turbine shaft projecting rearwardly therefrom, and at least two turbine blades for rotatably driving said turbine shaft;

a power supply unit having a rotatable power shaft within a unit housing, and power generation means responsive to rotation of said power shaft for providing a power source;

said power shaft having a generally hollow tubular shape defining a front end and a rear end within said unit housing, said turbine shaft extending from said hub generally coaxially within said power shaft and having a rear end connected to said power shaft generally at the rear end of said power shaft whereby said turbine shaft rotatably drives said power shaft; and a shaft bearing arrangement including a first bearing unit for rotatably supporting said power shaft generally at the rear end thereof within said housing, a second bearing unit for rotatably supporting said power shaft generally at the front end thereof within said housing, and a third bearing unit for rotatably supporting said turbine shaft within said housing at a position generally adjacent to said front end of said power shaft, said third bearing unit being supported within said housing by a resilient mount ring whereby fluctuating vibrational loads on said turbine shaft are substantially isolated from said housing and said power shaft.

2. The ram air turbine power system of claim 1 wherein said power supply unit comprises an electrical generator.

3. The ram air turbine power system of claim 2 further including an hydraulic pump unit having a pump shaft connected generally in-line with said power shaft.

4. The ram air turbine power system of claim 3 further including a hollow strut for supporting said ram air turbine, said electrical generator, and said hydraulic pump unit from an aircraft, said electrical generator and said hydraulic pump unit respectively including electrical and hydraulic lines extending through said hollow strut to the aircraft.

5. The ram air turbine power system of claim 2 further including a hollow strut for supporting said ram air turbine and said electrical generator from an aircraft, said generator including an electrical line extending through said hollow strut to the aircraft.

6. In a ram air turbine power system having a ram air turbine with at least two turbine blades for rotatably driving a turbine shaft, and a power supply unit having a power shaft defining front and rear ends and rotatably supported within a unit housing for driving power generation means to provide a power source; a shaft and bearing arrangement for in-line connection of said turbine and power shafts, comprising;

a first bearing unit rotatably supporting said rear end of said power shaft within said unit housing;

said power shaft having a hollow shape, said turbine shaft extending generally coaxially within said power shaft and having a distal end thereof connected to said power shaft generally at said power shaft rear end, whereby said turbine shaft is connected to said power shaft for rotational driving thereof, and further whereby said first bearing unit provides common support for said power shaft and said turbine shaft;

a second bearing unit rotatably supporting said front end of said power shaft within said unit housing;

a third bearing unit rotatably supporting said turbine shaft within said unit housing at a position generally adjacent to said power shaft front end; and resilient bearing mount means interposed between said third bearing unit and said unit housing to isolate said unit housing and said power shaft from fluctuating and vibrational loads encountered by said turbine shaft.

7. The shaft and bearing arrangement of claim 6 wherein said power supply unit comprises an electrical generator.

8. The shaft and bearing arrangement of claim 7 further including an hydraulic pump unit having a pump shaft connected generally in-line with said power shaft.

9. The shaft and bearing arrangement of claim 8 further including a hollow strut for supporting said ram air turbine, said electrical generator, and said hydraulic pump unit from an aircraft, said electrical generator and said hydraulic pump unit respectively including electrical and hydraulic lines extending through said hollow strut to the aircraft.

10. The shaft and bearing arrangement of claim 7 further including a hollow strut for supporting said ram air turbine and said electrical generator from an aircraft, said generator including an electrical line extending through said hollow strut to the aircraft.

* * * * *